Figure 1:
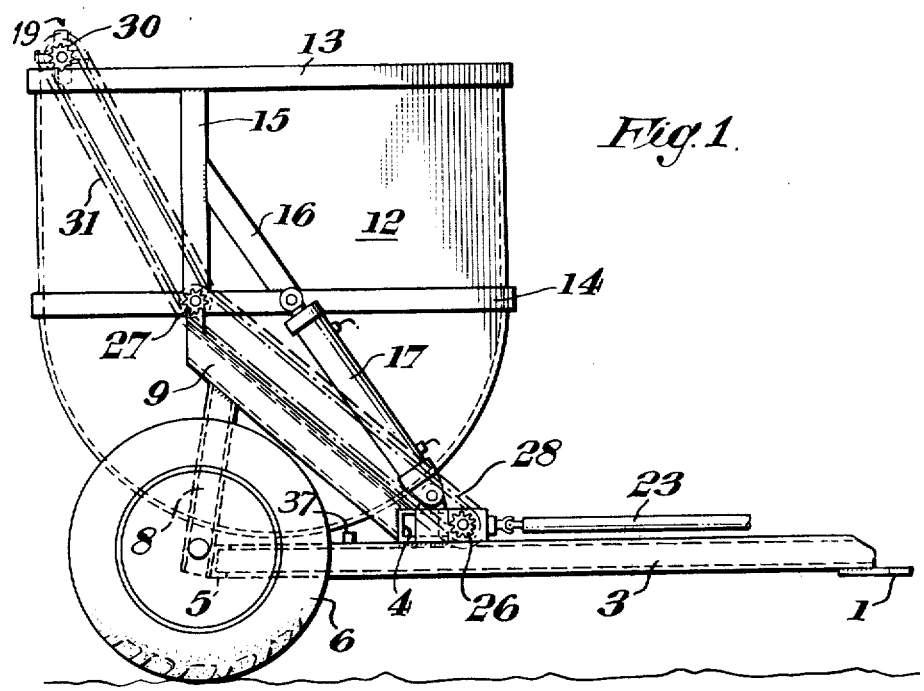

United States Patent
Chapman

[11] 3,888,424
[45] June 10, 1975

[54] MANURE SPREADER

[75] Inventor: Arthur John Chapman, South Chailey, England

[73] Assignee: Sperry Rand Corporation, New Holland, Pa.

[22] Filed: Nov. 19, 1973

[21] Appl. No.: 417,454

[30] Foreign Application Priority Data
Nov. 29, 1972 United Kingdom............... 55165/72

[52] U.S. Cl. ............... 239/657; 239/664; 239/670; 222/164
[51] Int. Cl. ......................... A01c 3/06; A01c 15/00
[58] Field of Search ........... 239/650, 657, 658, 661, 239/662, 664, 670, 672, 679, 680; 222/166, 164

[56] References Cited
UNITED STATES PATENTS

| | | | |
|---|---|---|---|
| 1,606,949 | 11/1926 | Litchfield | 239/657 |
| 2,359,412 | 10/1944 | Flink | 239/657 |
| 2,416,224 | 2/1947 | Schmied | 239/657 |
| 2,673,741 | 3/1954 | Durand | 239/650 |
| 2,885,209 | 5/1959 | Bruecker | 239/657 |
| 3,195,899 | 7/1965 | Neuenschwander | 239/657 X |
| 3,730,396 | 5/1974 | Harper et al. | 222/166 |

FOREIGN PATENTS OR APPLICATIONS
759,559  10/1956  United Kingdom................ 222/164

*Primary Examiner*—Robert S. Ward, Jr.
*Attorney, Agent, or Firm*—Frank A. Seemar; John R. Flanagan; Joseph A. Brown

[57] ABSTRACT

A wheeled vehicle for distributing material over the land which is simple and economic to manufacture but capable of handling a wide range of material, including natural manure whatever the consistency thereof. The vehicle comprises a container for the material, the container being open at the top and pivotable about an axis located intermediate the top and bottom thereof, and power means operable to control tipping of the container about the pivot axis. A beater or the like may be provided to help discharge and spread the material.

16 Claims, 3 Drawing Figures

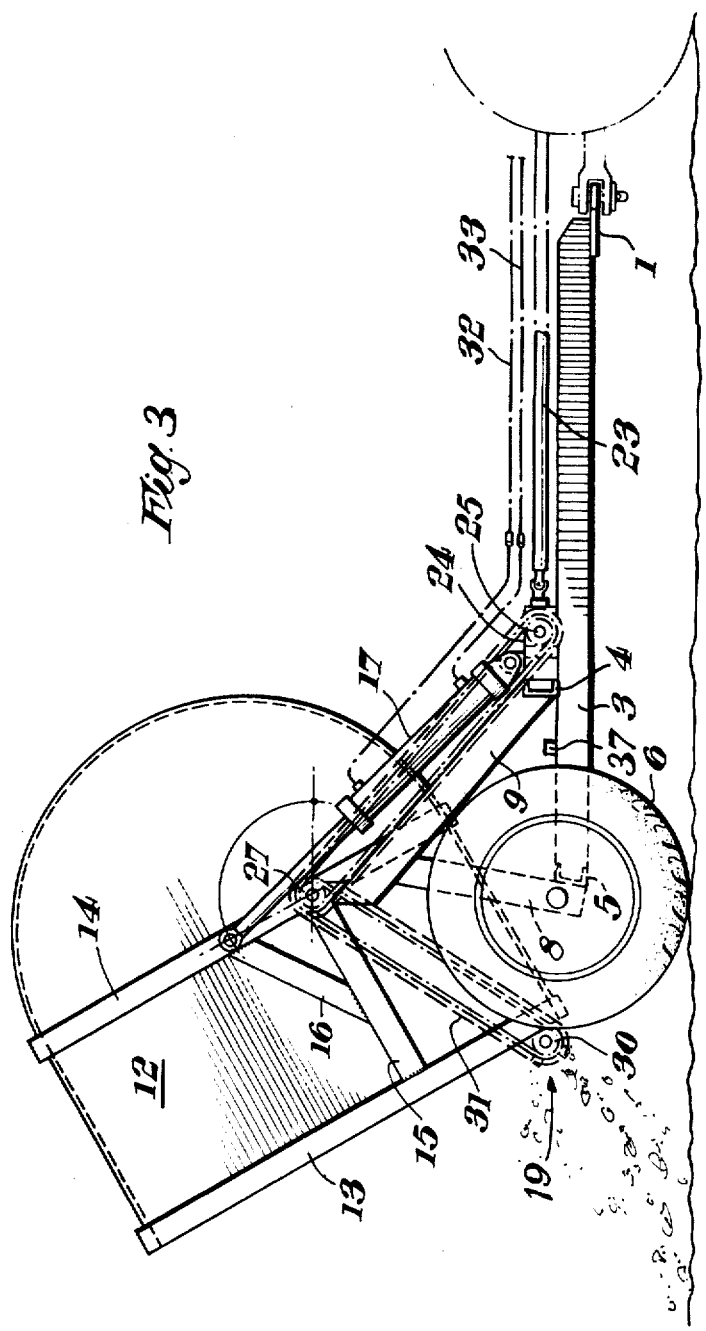

MANURE SPREADER

This invention relates to wheeled vehicles for distributing material, in particular over the land. The term "vehicle" is used herein to include both a self-propelled vehicle and a trailer or the like provided with hitch connections by means of which it can be attached to a tractor or other self-propelled vehicle.

It is a particular object of the invention to provide a wheeled vehicle for distributing either natural or artificial fertiliser on land being prepared for growing crops. Devices for spreading fertilisers are well known but most such devices are particularly suited for distributing either liquid materials or solid materials, and do not work efficiently when the material to be distributed consists of a mixture of liquids and solids as is very often the case, particularly with natural manure or fertiliser. In particular, one known device for distributing liquid manure consists primarily of a container and a pump feeding a number of nozzles adapted to supply a plurality of jets of liquid which fall on the ground. Such pumps suffer from the disadvantage that they are put out of operation if there are any solids contained in the material to be distributed. On the other hand, distributors for solid materials may be, for example, in the form of a tipping vehicle. In such vehicles, the body is normally pivotable about a transverse axis located substantially at the lower rear edge of the vehicle, and power means are provided to raise the forward end of the body on the vehicle chassis so that the floor of the body slopes downwardly from the front to the rear. With such a vehicle, solid material can be distributed reasonably efficiently but any liquid material will run out almost immediately tipping commences. Furthermore, such vehicles can be dangerous if driven over rough ground with the body disposed at the maximum angle of tilt since overturning can easily result.

According to the present invention a wheeled vehicle for distributing material comprises a container for the material, the container being open at the top and pivotable about an axis located intermediate the top and bottom thereof, and power means operable to control tipping of the container about the pivot axis.

It is to be understood that any reference herein to the top and bottom of the container refer to the corresponding parts of the container when the vehicle is standing on relatively level ground with the container in its rest or upright position, that is to say with the opening in the container uppermost.

The pivot axis, which is preferably horizontal, may be located substantially midway between the top and bottom of the container and may pass through a normally vertical axis of the container which in turn passes through the centre of gravity of the latter, in which case the pivot axis will pass through the centre of gravity of the container. However, the pivot axis is conveniently located slightly to the rear of said vertical axis to avoid complexity in the construction of the vehicle chassis. Preferably, the pivot axis is located parallel to, and vertically above, the axis of rear wheels of the vehicle and in this case said vertical axis of the container is located slightly forward of the rear wheel axis. The container is preferably arranged to be tiltable to an angle sufficient to allow any solids in the container to be emptied therefrom without difficulty, whatever the consistency thereof. For this purpose, it is recommended that the container should be capable of being tilted so that a rear wall or wall portion of the container is disposed at an angle of about 55° to the horizontal.

The container may be generally cup-shaped, that is to say it may consist of a substantially hemispherical lower portion integral with an upper, generally cylindrical, portion. Alternatively, the sides of the container may be straight so that it is rectangular as seen in plan view and generally U-shaped as seen in one cross-sectional view. Whatever the precise shape of the container, the overall height of the container is preferably greater than the width (diameter in the case of a cylindrical arrangement) of the container. If the container is other than circular in plan, the height of the container may also be greater than the length of the container. In this way, the free surface area of material in the container is small compared with the total surface area so that the problem of slopping in transit is reduced or eliminated.

Tipping of the container about the pivot axis is preferably controlled by one or more hydraulic jacks connected to the hydraulic system of the vehicle in the case of a self-propelled vehicle, or to the hydraulic system of a tractor or other propelling vehicle in the case of a trailer vehicle. Alternatively, tipping may be controlled by a screw jack or other mechanical device. Whatever type of control is employed, it is preferable to synchronise the operation thereof with the forward speed of the vehicle, or otherwise, so as to obtain an even distribution of material at a predetermined rate.

The vehicle preferably embodies support means which are engaged by the container in the rest or upright position thereof so that the weight of the container is taken by the support means, thereby relieving stress on the pivots which take the weight of the container in all other positions of the latter. The provision of these support means, which may comprise one or more beams forming part of a chassis for the vehicle, gives stability to the container during movement of the vehicle with the container in the upright position as well as reducing the vertical and lateral stresses on the pivots.

If desired, that top edge of the container which is always lowered during tipping movement may be provided with a rotatable beater or other distributor driven, for example, from the vehicle or the tractor engine. The beater or other distributor may be equipped with a plurality of flails or the like, the outer ends of which are preferably arranged to brush the adjacent edge of the container.

If desired, the pivot axis may be coincident with, or parallel to, the fore-and-aft axis of the vehicle instead of being transverse thereto, but in most instances, the transverse arrangement will be found to be more convenient.

Preferably, the width of the vehicle does not exceed eight feet so that it can be conveniently driven through farm gates and, if necessary, along the highway.

Figure 2:
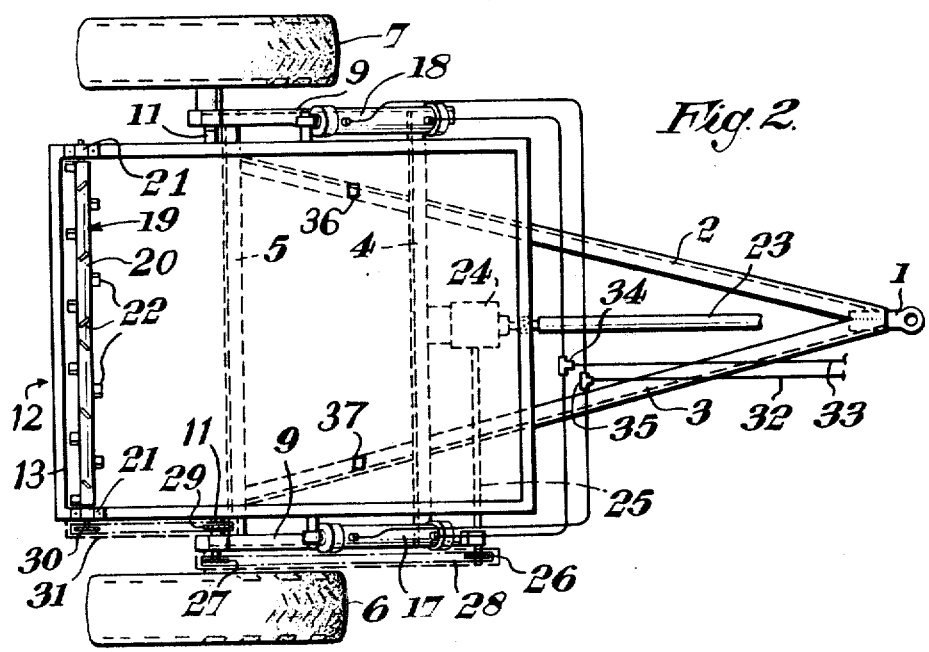

A wheeled vehicle for spreading manure and constructed in accordance with the invention will now be described in greater detail, by way of example, with reference to the accompanying diagrammatic drawings, in which:

FIG. 1 is a side view of the vehicle with a container for the manure in a rest or upright position, FIG. 2 is a plan view of FIG. 1, and FIG. 3 is a view similar to that of FIG. 1 but showing the container in a fully pivoted or tipped position.

The vehicle illustrated is in the form of a trailer provided with a hitch connection 1 by means of which it can be attached to a tractor or other self-propelled vehicle. The trailer includes a chassis comprising two converging, generally longitudinal, beams 2 and 3 (FIG. 2) and two transverse beams 4 and 5. Two stub axles are fixed to the rear of the chassis and wheels 6 and 7 are rotatably mounted thereon.

Upstanding from respective sides of the chassis are two pairs of support members 8 and 9. Pivotally mounted between these support members by pivots 11 is a liquidtight container 12 of sheet metal construction, the pivots being welded to the respective sides of the container and received in bushes in the supports 9. As can be seen from FIG. 2, the container 12 is open at the top and the opening is rectangular. As can be seen from FIG. 1, the cross-section of the container 12 taken longitudinally of the vehicle is U-shaped. Each side of the container 12 is substantially flat and the container is strengthened by a rectangular peripheral frame 13 defining the opening at the top of the container, and a further similar frame 14 parallel to the frame 13 and in the same plane as the pivot axis which passes through the pivots 11. The container 12 is further strengthened on each side by upright members 15 and inclined members 16. The overall height of the container 12 illustrated is 2 metres, the width being 1½ metres and the front-to-rear dimension (or length) being 2 metres. Thus the height is greater than the width and equal to the length so that the magnitude of the free surface area of manure in the container 12 is low compared with the total surface area.

The pivot axis is parallel to the axis of rotation of the wheels 6 and 7 and is located vertically thereabove at a position substantially midway between the top and bottom of the container 12. The centre of gravity of the container 12 is also midway between the top and bottom thereof so that it lies in a horizontal plane (as seen in FIG. 1) containing the pivot axis but the latter is displaced rearwardly thereof by about 33 centimetres. Ideally, the pivot axis should pass through the centre of gravity of the container 12 to minimise the effort required to tip the container but this necessitates certain complexities in the construction of the chassis in the illustrated embodiment which are avoided by the mentioned rearward displacement of the pivot axis. This displacement is such that the effort to tip the container 12 is still comparatively low and indeed, the empty container can be pivoted manually with relative ease.

Tipping of the container 12 is controlled by a pair of double-acting hydraulic jacks 17 and 18. One end of each jack 17, 18 is pivotally mounted on a bracket attached to the chassis while the other end of each jack is pivotally attached to the strengthening frame 14. It will be seen that, when the jacks 17, 18 are fully retracted, as in FIG. 1, the two frames 13 and 14 are parallel to the plane of the chassis and, accordingly, are substantially horizontal. The transverse plane of symmetry of the container 12 is vertical under these conditions. When the jacks 17, 18 are extended, the container 12 is rotated about the pivot axis in an anticlockwise direction, as seen in FIGS. 1 and 3, and preferably, when the jacks are fully extended, the said plane of symmetry, and hence the rear wall of the container 12, is disposed at an angle of about 55° to the horizontal in which position the lower edge of the top of the container is close to the ground. It will be appreciated that the maximum angle of tilt is governed to some extent by the need to avoid the extended jacks 17, 18 fouling the pivots 11.

Mounted on the frame 13 and located at the rear edge of the top of the container 12 is a distributor in the form of a rotatable beater 19 having an overall diameter of 9 inches and comprising a shaft 20 rotatably mounted in bearings 21 in the frame 13. The shaft 20 of the beater 19 is provided with a plurality of flails 22 the plane of which is inclined with respect to the axis of the shaft 20, the flails on one half of the shaft being inclined oppositely to the flails on the other half such that the flails serve to spread the manure over a width greater than that of the overall width of the vehicle, the spread being 2 to 2½ times the width of the container, i.e., 3 to 4 metres in the present case. The flails 22 disposed centrally of the shaft 20 have non-inclined components to ensure that manure is spread over the central area of spread. The beater 19 is disposed such that the outer ends of the flails brush the adjacent edge of the container 12, whereby even entirely liquid material will be acted upon by the flails and spread in the desired manner. The beater 19 is driven from a shaft 23 through a pair of bevel gears in a gearbox 24 (FIG. 2), a transverse shaft 25, sprockets 26 and 27 coupled by a chain 28, and sprockets 29 and 30 coupled by a chain 31. It will be noted that the transition between the two chains 28 and 31 is at the pivot axis so that drive to the beater 19 is not affected on tilting the container 12.

When the vehicle is in use, the shaft 23 is driven from the power take-off shaft of the propelling tractor (not shown) and pipes 32 and 33 which lead through T-joints 34 and 35 to the two jacks 17 and 18 are connected to the hydraulic system of the tractor. Preferably, the jacks 17, 18 are extended slowly and progressively as the container 12 is emptied. If the tractor is provided with valve means which enable hydraulic fluid to be supplied to the jacks 17, 18 at a sufficiently low rate, it is only necessary to engage these valve means at the beginning of a run. The tilt of the container 12 can then be progressively increased automatically as the vehicle is driven over a field and, as a result, material will be deposited on the ground at a controlled, even rate. However, in many cases, it may be found that the lowest rate at which it is possible to supply the hydraulic fluid to the jacks 17, 18 under the control of the tractor valve system is too fast for the desired purpose. Under these conditions, the valve means may be engaged and disengaged manually for short periods during the run. However, if automatic operation is required, it is preferred that further valves should be included in the hydraulic lines to the jacks 17, 18 and that these valves should be opened and closed periodically either from the rotation of the wheels 6 and 7 or from the rotation of the shaft 23, or some other component driven by this shaft. Cam-operated valves suitable for this purpose are well known and, accordingly, need not be described in detail.

In use of the vehicle, filling of the container 12 with manure is accomplished in the upright position thereof shown in FIG. 1 and the vehicle taken to the required location for spreading of the manure. The distance between the point of filling and the point of distribution may be considerable, for example a number of miles, in which case it is desirable to minimise spillage of the manure from the container 12 during transit both for economical reasons and from the standpoint of transgressing laws relating to the fouling of highways. This problem of spillage occurs in relation to manure having a relatively high liquid content which manure is becoming more abundant with the increasing tendency to provide Winter housing for cattle. Underground slurry tanks are provided into which dung from the floor of the buildings is slushed. Alternatively, the buildings may have slatted floors through which the dung passes and flows to the slurry tank. With the minimising of the free surface area of the manure in the container 12, slopping of the manure due to travel over uneven of sloping ground, or to stopping and starting of the vehicle, is in turn minimised. In the upright position of the container 12, the bottom thereof sits on the beams 2 and 3, by virtue of contacting blocks 36, 37 provided on the latter, and may also engage the beam 4, which beams therefore provide support for the container in this position and relieve the vertical stress on the pivots 11. Also, the container is more stable laterally of the vehicle when sitting on the beams 2, 3 and 4 so that the pivots 11 are further relieved of some lateral stresses.

When at the distribution point, the vehicle is driven back and forth across the area over which the manure is to be spread with the container 12 being gradually pivoted about the pivots 11 by the extension of the hydraulic jacks 17, 18 either by automatic or manual control of pressure fluid thereto as discussed above. As the container 12 is tipped, manure tends to flow over the rear edge thereof and is distributed over about 3 to 4 metres by the action of the beater 19 which is rotated anticlockwise as seen in FIG. 1. The illustrated container 12 holds 1,175 gallons when full to the brim and although it is always filled to about 1 foot below the brim, to give a capacity of the order of 1,000 gallons, in view of the slopping problems discussed, the contents can be distributed in about 2 or 3 minutes depending on the required rate of distribution. The maximum angle of tip of the container 12 is preferably such that all manure will be emptied therefrom whatever the consistency of the manure and an angle of about 55° of the rear wall of the container with respect to the horizontal is found to be acceptable in this regard although an angle less than this is shown in FIG. 3 as this, like the other figures, is somewhat diagrammatic. It will be appreciated that for very wet or dry manure, emptying of the container 12 will be accomplished before the maximum angle of tilt is reached. The curved bottom of the container 12 facilitates the self-cleaning action.

The important advantage to be borne in mind is that the vehicle is capable of handling any type of manure or fertiliser without modification and can even tolerate the presence of foreign objects such as bricks or scrap metal since these are normally flipped over the rotating beater 19 without serious damage thereto. If the beater should sustain damage or become inoperative for other reasons, it will be noted that it is entirely accessible even with the container 12 full of manure. Therefore, repair normally can be effected without emptying but if this should not prove possible or desirable, emptying can still take place merely by tipping the container even though the normal spreading over 3 or 4 metres will not be achieved. However, the contrast with known spreaders which cannot be emptied by the normal means if a fault occurs but which have to be emptied to remedy the fault is significant.

Due to the fact that the vehicle can handle all types of material, it can be employed in a number of activities with which a farmer is involved in addition to manure spreading and, therefore, the vehicle is an extremely versatile piece of equipment in this respect.

When comparatively dry manure is being handled, it may have a tendency to flow over the beater 19 without being spread by the latter. To obviate this, a larger diameter beater may be employed or a second beater mounted to the right and parallel to the existing beater as seen in FIG. 1 may be provided, the additional beater being arranged to rotate in direction opposite to that of the other beater so as to break up and spread any material tending to flow over the latter. A further modification which may be made to the illustrated embodiment of the invention is the provision of a shield on the forward top edge (right-hand top edge as seen in FIG. 1) to protect the tractor driver from any slopping which might on occasions occur. The shield may be of sheet metal and may extend part way along the two sides of the container 12.

It will be appreciated from the foregoing description that a vehicle constructed in accordance with the invention is simple, robust, efficient and versatile, thereby offering a number of advantages over existing material spreaders. In particular, one advantage is the low power required for tipping the container 12 even when full, and another is the fact that the centre of gravity of the container 12 is maintained substantially at the same height irrespective of the angle of tilt of the container, thereby affording the vehicle much greater stability than previous vehicles.

What we claim is:

1. A wheeled vehicle for distributing material comprising:
    a. an open-topped container for accommodating the material,
    b. means for pivotably mounting said container about a pivot axis located intermediate the top and bottom thereof,
    c. said pivot axis being substantially horizontal and passing through a normally vertical axis of the container which in turn passes in the vicinity of the center of gravity of the container,
    d. power means operable to control tipping of the container about the pivot axis, and
    e. support means for engaging the container in a rest or upright position thereof so that the weight of the container is taken by the support means, thereby relieving stress on the pivots which normally take the weight of the container in various other positions of the latter.

2. A vehicle as set forth in claim 1 wherein the pivot axis is located substantially midway between the top and bottom of the container.

3. A vehicle as set forth in claim 2 wherein the pivot axis is located rearwardly of the normally vertical axis of the container.

4. A vehicle as set forth in claim 3 wherein the pivot axis is located parallel to, and vertically above, a rear axis of the vehicle.

5. A vehicle as set forth in claim 4 wherein the container is pivotable about the pivot axis to a position in which said normally vertical axis is at an angle of approximately 55° to the horizontal.

6. A vehicle as set forth in claim 1 wherein the container has a substantially hemispherical lower portion and an integral generally cylindrical upper portion.

7. A vehicle as set forth in claim 6 wherein the overall height of the container is greater than the width of the container.

8. A vehicle as set forth in claim 7 wherein the overall height of the container is greater than the length of the container.

9. A vehicle as set forth in claim 1 wherein said support means further comprises a chassis formed by a plurality of beams, one or more of the beams engaging the container in said rest or upright position.

10. A vehicle as set forth in claim 1 wherein the top edge of the container, which is lowered during tipping movement, is provided with a rotatable material distributor.

11. A vehicle as set forth in claim 10 wherein the distributor is in the form of a beater having a plurality of flails, the outer ends of which are arranged to pass adjacent to the edge of the container.

12. A wheeled vehicle for distributing material comprising:
   a. an open-topped container for accommodating the material,
   b. a material distributor mounted in the vicinity of the top of said container,
   c. means for pivotably mounting said container about a pivot axis located intermediate the top and bottom thereof,
   d. said pivot axis being substantially horizontal and passing through a normally vertical axis of the container which in turn passes in the vicinity of the center of gravity of the container,
   e. power means operable to control tipping of the container about the pivot axis, and
   f. means to control said power means in a predetermined manner to effect even distribution of the material from the container under conditions where said container is tipped and said material engages said material distributor.

13. A vehicle as set forth in claim 12 wherein operation of the power means is synchronized with the forward speed of the vehicle.

14. A vehicle as set forth in claim 13 wherein said material distributor is rotatably mounted at the top edge of the container, which is lowered during tipping movement.

15. A vehicle as set forth in claim 14 wherein the material distributor is in the form of a beater having a plurality of flails, the outer ends of which are arranged to pass adjacent to the edge of the container.

16. A vehicle as set forth in claim 14 wherein said material distributor means is driven by a two part chain drive, the transition between the one part and the other part being at the pivot axis, whereby drive to the distributor is not affected by tilting of the container about the pivot axis.

* * * * *